June 17, 1941.  H. B. RUDD  2,246,145
MECHANISM FOR BREAKING THE FROZEN CONNECTIONS OF ICE CUBES
Filed March 31, 1938   3 Sheets-Sheet 1
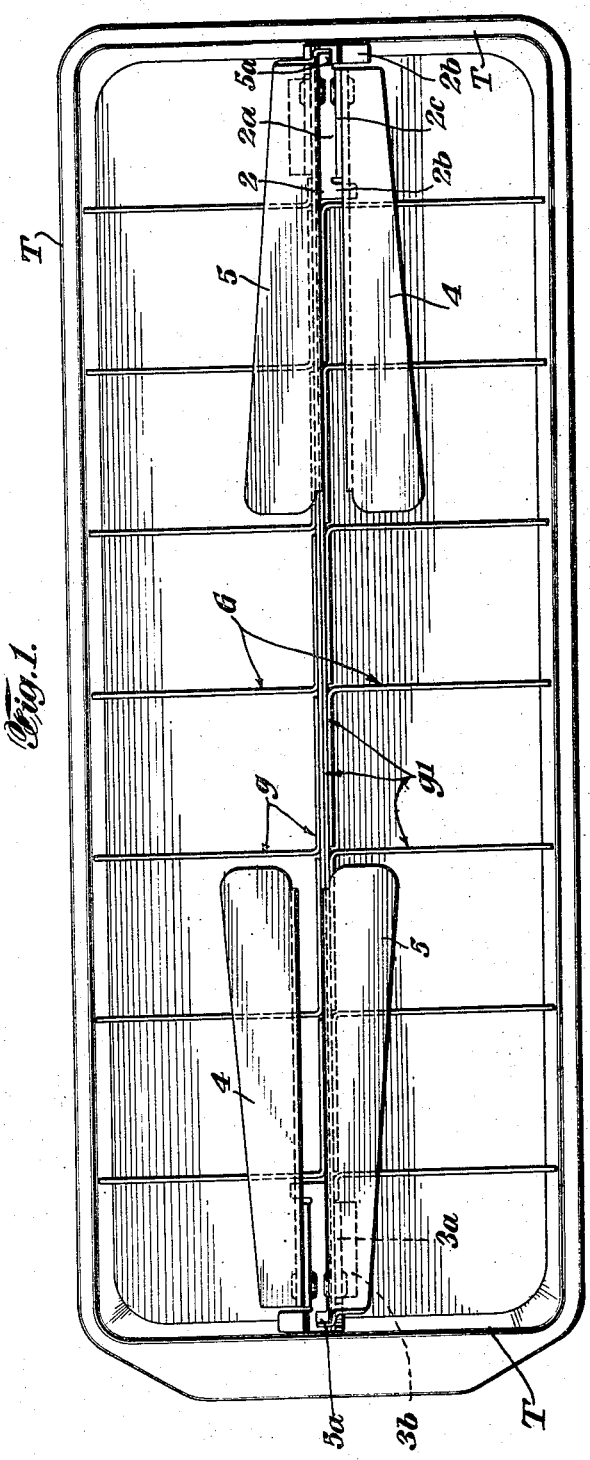
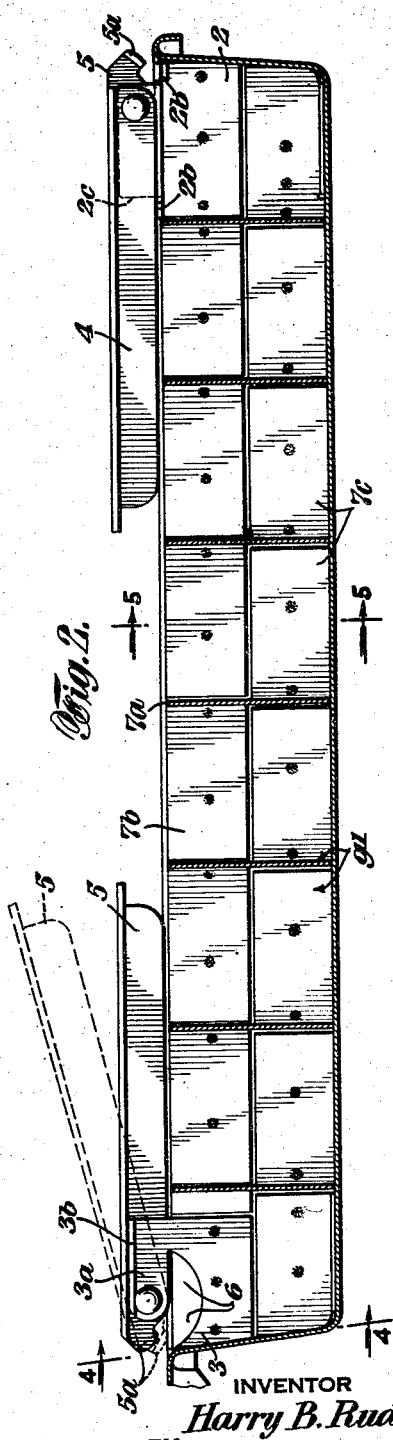
INVENTOR
*Harry B. Rudd*
BY
*Ward, Crosby & Neal*
ATTORNEYS

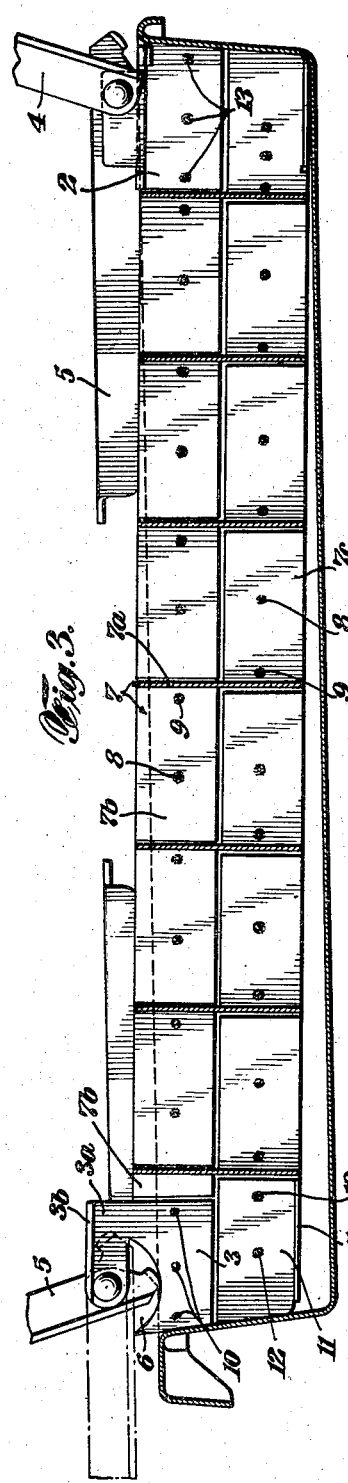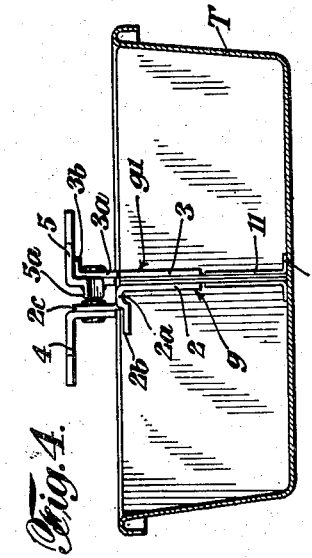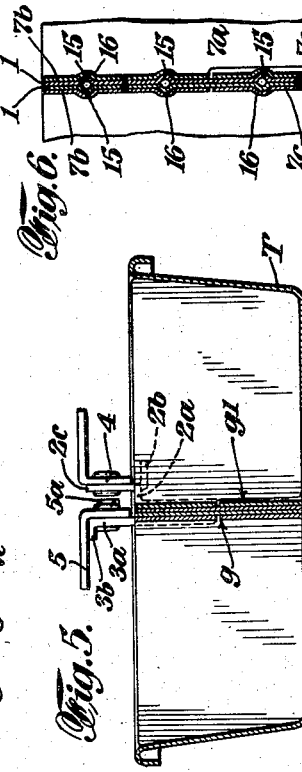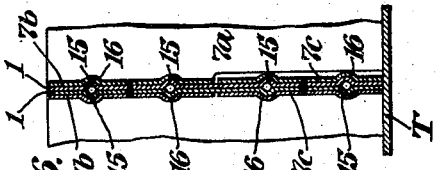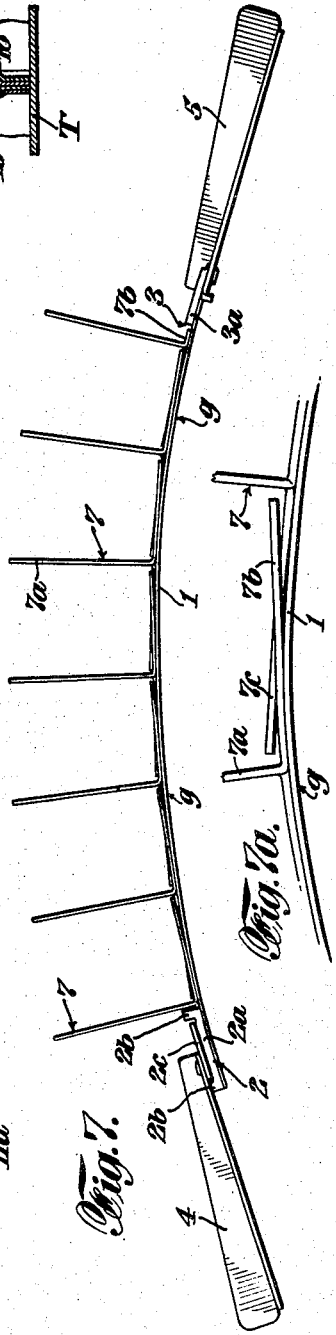

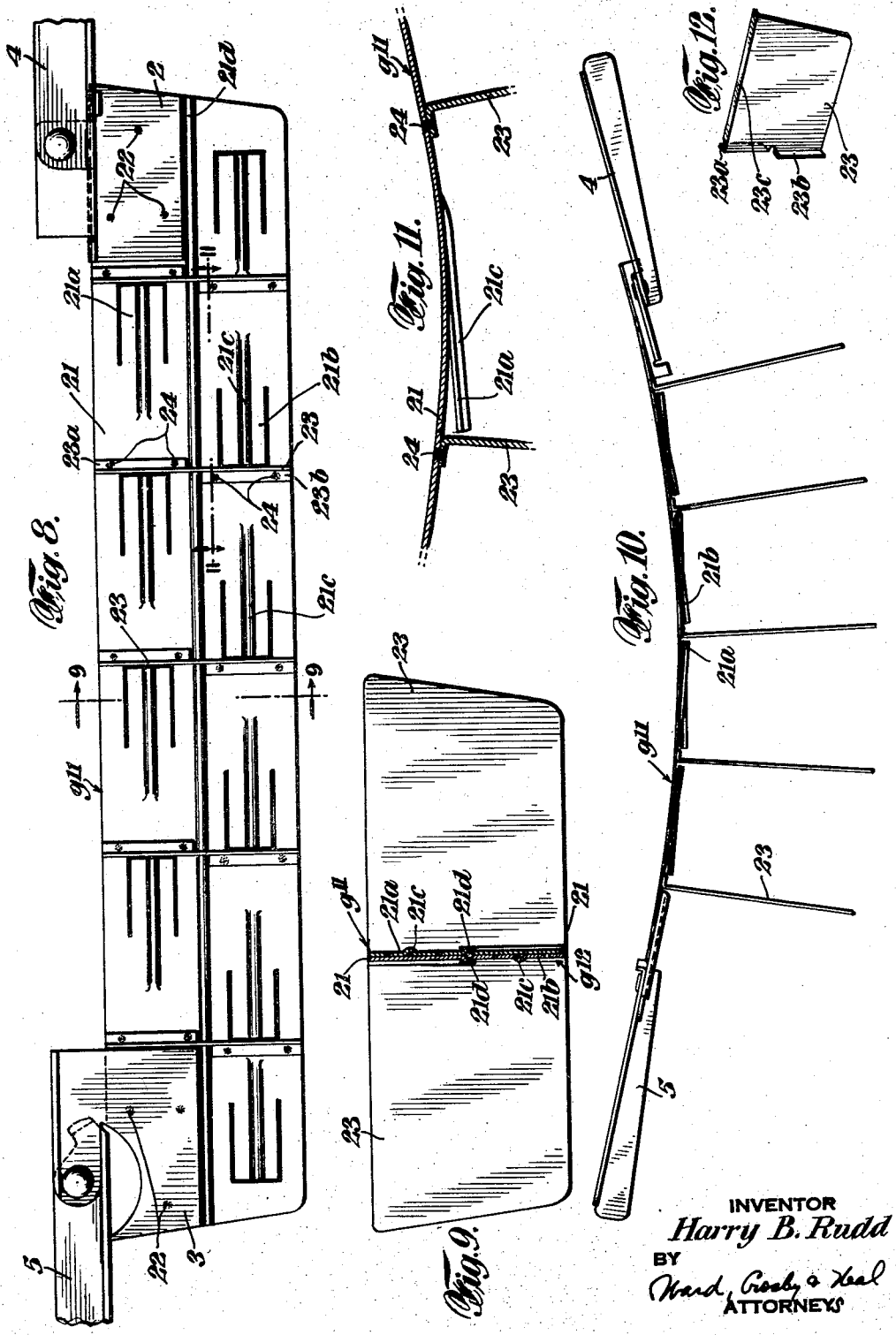

Patented June 17, 1941

2,246,145

UNITED STATES PATENT OFFICE 2,246,145

MECHANISM FOR BREAKING THE FROZEN CONNECTIONS OF ICE CUBES

Harry B. Rudd, Flushing, N. Y.

Application March 31, 1938, Serial No. 199,062

6 Claims. (Cl. 62—108.5)

My invention relates to an improved mechanism for breaking the frozen connections which hold ice cubes in adhering relation with a tray and/or a grid arrangement disposed in said tray.

In accordance with my invention, the novel mechanism as disclosed comprises a grid arrangement formed from a plurality of separate grid structures removable, preferably, individually from a tray and, preferably, manually operable to free the ice cubes therefrom.

Various other features, objects and advantages of my invention will become apparent from the following description.

My invention resides in the improved mechanism, grid arrangement, combinations and features of the character hereinafter described and claimed.

For an understanding of my invention and for an illustration of some of the forms thereof, reference is to be had to the accompanying drawings, in which:

Figure 1 is a plan view of an associated tray and grid arrangement as constructed in accordance with my invention;

Fig. 2 is a longitudinal, vertical sectional view, partly in elevation, of the mechanism or device shown in Fig. 1;

Fig. 3 is a longitudinal, vertical sectional view, partly in elevation, showing my novel device as it appears during operation thereof to break the frozen connections holding the ice cubes to the tray;

Fig. 4 is a transverse, vertical sectional view, partly in elevation, and is taken on the line 4—4 of Fig. 2 looking in the direction of the arrows;

Fig. 5 is a transverse, vertical sectional view, partly in elevation and is taken on the line 5—5 of Fig. 2 looking in the direction of the arrows;

Fig. 6 is an enlarged sectional view, partly in elevation, showing a feature of the invention;

Fig. 7 is a plan view showing one of the grid structures in an operated position;

Fig. 7a is an enlarged plan view showing a feature of the invention;

Fig. 8 is an elevational view showing a grid arrangement of a modified form;

Fig. 9 is a transverse, vertical sectional view, partly in elevation and is taken on the line 9—9 of Fig. 8 looking in the direction of the arrows;

Fig. 10 is a plan view showing the grid structure of Fig. 8 in an operated position;

Fig. 11 is a horizontal sectional view taken on the line 11—11 of Fig. 8 looking in the direction of the arrows; and Fig. 12 is a perspective view showing another feature of the invention.

As shown in Figs. 1, 2 and 3, T represents a tray, receptacle or the like such, for example, as one formed from sheet metal adapted for the reception of a suitable grid arrangement which is associatable therewith in such manner that ice cubes are formed by a freezing action after the compartments of said tray or receptacle have been filled with water and disposed in the refrigerating compartment of an electric or gas refrigerator, or equivalent.

In accordance with my invention, a grid arrangement G of novel construction and operation is detachably associated with the tray T so that, by operation of said grid arrangement, the ice cubes—either true cubes or "cubes," some faces of which have greater area than other faces—may readily be detached from those surfaces to which the ice adheres as a result of the freezing operation.

In the form of the invention disclosed in Figs. 1–7a inclusive, the aforesaid grid arrangement G comprises a grid structure $g$ formed from a strap-like supporting member 1 having at one end a plate section 2 and at its other end a plate section 3, these plate sections 2 and 3 being suitably secured to said supporting member 1, for example, in the manner hereinafter described. The plate section 2, approximately at the upper surface of the supporting member 1 comprises a lateral, horizontal section 2a terminating in spaced projecting end sections 2b between which is disposed a vertical upstanding section 2c having a handle 4 pivoted thereto. The plate section 3 comprises a vertical section 3a extending above the supporting member 1 and terminating in a lateral section 3b, a handle 5 being pivoted to said vertical section 3a and said handle 5 comprising a lateral cam section 5a utilizable as hereinafter described. As shown in Figs. 2 and 3, adjacent sections of the plate section 3 and the supporting member 1 are cut away beneath the pivot for the handle 5, as shown at 6 so as to provide space within which the lower end of said handle 5 may move freely during pivotal movement thereof.

As clearly illustrated on the drawings, the aforesaid grid arrangement G comprises, in addition to the grid structure $g$, a second grid structure $g1$ which, preferably, is a duplicate or substantially so, of said grid structure $g$, and the two grid structures $g$ and $g1$ being separate from and unconnected to each other as hereinafter more fully described. In view of the duplicate character of said grid structures, the parts of the grid structure g1 have been given the same reference characters as are applied to the corresponding parts of the grid structure g.

As clearly appears from a consideration of Figs. 1-5, inclusive, the grid structures g and g1 are adapted to be disposed in side-by-side relation interiorly and longitudinally of the tray T. When thus disposed in accordance with the invention, the grid structures g and g1 are so arranged that the plate section 2 and handle 4 of the grid structure g is at the same end of the tray as the plate section 3 and handle 5 of the complementary grid structure g1, the plate section 3 and handle 5 of the grid structure g being at the same end of said tray as the plate section 2 and handle 4 of the grid structure g1.

Each of the supporting members 1 of the grid structures g, g1 serves as a support for suitable grid means, such, for example, as a plurality of grid members 7 which cooperate with each other and with the walls of the tray T in order to form compartments in which the respective ice cubes are frozen. As shown, each grid member 7 comprises a section 7a which is disposed laterally of its supporting member 1 and, further, each grid member 7 comprises upper and lower oppositely extending kicker or wing sections 7b and 7c having substantially the same length and height, such kicker section height being approximately one-half that of the adjacent lateral section 7a. Still further, the kicker sections 7b, 7c of each grid member 7 should be disposed in the same plane and this plane should be substantially at right angles to the plane of the lateral section 7a of said last named member 7.

As hereinbefore stated, the respective members 1 serve as supports for the herein described grid members 7. To this end and as shown, the kicker sections 7b, 7c of each grid member 7 are suitably secured to the proper supporting member 1, for example, by rivets but preferably by a spot-welding operation as shown. Thus, it is desirable that each kicker section 7b, 7c, approximately midway between the ends thereof, shall be spot-welded to the adjacent supporting member 1 as indicated at 8. In addition, it is desirable that each kicker section 7b, 7c be further spot-welded to said supporting member 1 as indicated at 9, the welds 9 being much closer to the respective lateral grid sections 7a as shown. These additional welded zones strengthen the device in an obvious manner but it is to be understood that the invention is not to be limited in this respect.

As appears from a consideration of Figs. 2 and 3, that grid member 7 at the extreme left of the grid structure g1 may have its kicker section 7b shortened so as to provide space for the reception of the plate section 3 which is spot-welded in a plurality of zones 10 to the adjacent surface of the supporting member 1. Beneath the plate section 3, there is a missing kicker section and this space should be occupied by a filler plate 11 secured in a plurality of spot-welded zones 12 to the adjacent surface of said supporting member 1. Further, for the reason hereinafter noted, as indicated in Figs. 2, 3 and 4, it is desirable that the filler plate 11 be flanged at the lower surface thereof as indicated at 11a. It is to be understood that one end of the grid structure g is constructed in the same manner as described immediately above with respect to the grid structure g1. Thus, as the grid structure g is positioned in Fig. 7, that grid member 7 at the extreme right is shortened as at 7b so as to provide space for the reception of the plate section 3 and the filler plate 11 disposed therebelow.

Further referring to Figs. 2 and 3, it will be noted that a kicker section 7b is necessarily missing from the space above that kicker section 7c at the extreme right, the latter preferably comprising a flanged lower surface 11a the same as the hereinbefore described filler plate 11. This space is filled by the aforesaid plate section 2 which, as indicated, is spot-welded in a plurality of zones 13 to the adjacent surface of the supporting member 1. It shall be understood that one end of the grid structure g is constructed and arranged in the same manner as described immediately above with respect to the grid structure g1. Thus, as the grid structure g is shown in Fig. 7, it will be noted that the plate section 2 thereof is in the space of the missing kicker section 7b and it will be understood that the space immediately therebelow is occupied by the kicker section 7c of that grid member 7 at the extreme left.

Preferably, the supporting members 1 and the kicker or wing sections 7b, 7c are formed from thin, flexible sheet steel. In accordance with the invention, it is highly desirable that adjacent surfaces of these supporting members 1 and kicker sections 7b, 7c be longitudinally grooved so as to strengthen the same and prevent undue deformation.

Thus, for example, each of the supporting members 1 may be provided with two, three, four or a different number of spaced longitudinally extending grooves 15, Fig. 6. As shown, it is desirable that these grooves be symmetrically placed in sets equidistantly spaced from the bottom of the tray T, the grooves 15 of each set preferably facing each other as illustrated.

Further, each kicker section 7b should be provided with a plurality of longitudinally extending grooves 16 spaced apart the same distance as each upper pair of grooves 15. The grooves 16 face in the same direction as the grooves on the respective supporting members 1 and, accordingly, it follows that the grooves 16 and the respective pairs of upper grooves 15 are adapted to be arranged in assembled relation as shown in Fig. 6.

Still further, each kicker section 7c should be provided with a plurality of longitudinally extending grooves 17 and these should be associated with the respective pairs of lower grooves 15 in the same manner as described above in connection with the upper pairs of grooves 15.

As regards the form of the invention shown in Figs. 1-7a, the above described grooves have been shown only in Fig. 6. For the sake of simplicity, the illustrations of such grooves have been omitted from Figs. 2-5 inclusive and Figs. 7, 7a.

When the herein described tray T, preferably of metallic material, and grid arrangement G are to be used for the freezing of ice cubes, the two grid structures g, g1 are disposed in the tray T in the manner illustrated in Fig. 1. As clearly appears from a consideration of the drawings and as pointed out in the preceding part of this description, the arrangement is such, that when the grid structures g, g1 are associated as shown in Fig. 1, one handle 4 is paired with a handle 5 at one end of the tray and the other handle 4 is paired with the other handle 5 at the other end of the tray. Furthermore, the arrangement is such, that when said grid structures g, g1 are associated as shown in Fig. 1, the cam section 5a of each handle 5 is disposed directly above the adjacent lateral section 2a of the adjacent plate section 2. Accordingly, with the tray T and the grid arrangement G associated as shown in Fig. 1, the tray T may be filled with water and then subjected to the freezing operation.

At any time after the freezing operation has been completed, the tray may be removed from the refrigerator and placed upon a table or other supporting surface. Then, one set of the handles 4, 5 may be grasped by one hand and the other set of handles 4, 5 by the other hand whereupon all of said handles are swung to their "open" positions as indicated in Fig. 7. In so doing, the cam section 5a at the left, Figs. 1, 2 and 3, moves along the upper surface of the adjacent section 2a and causes the grid structure g1 to assume a tilted relation with respect to the bottom tray wall, Fig. 3. At the same time, the cam section 5a at the right, Figs. 1, 2 and 3, coacts in a similar manner with the adjacent section 2a to thereby cause the adjacent grid structure g to assume a tilted relation in the opposite sense with respect to the bottom tray wall. In this manner, those frozen connections are broken which hold all of the ice cubes to the walls of the tray T.

In connection with the operation described above, it will be noted that the handles 4 are without function in so far as tilting of the grid structures g, g1 is concerned. These handles 4, then, could be omitted but this is not desirable because their presence is desirable in connection with the subsequent release of the ice cubes from the grid structures.

Although the two grid structures g, g1, at their respective opposite ends, are provided with cam members—cam section 5a and section 2a—which are adapted to coact with each other, it will be observed, in accordance with an important feature of the invention, that said grid structures g, g1 are entirely separable from each other. Therefore, after the frozen connections holding the ice cubes to the tray T have been broken as described above, either grid structure g or g1 may readily be removed from said tray T while leaving the other grid structure in said tray T. Of course, if desired, both grid structures g, g1 could be removed from the tray together.

In view of the foregoing, it clearly appears that, by my invention, two separate grid structures are provided and that the ice cubes adhere only to one side of each grid structure. Therefore, after the frozen connections holding the ice cubes to the tray have been broken, either grid structure g or g1 may be removed from the tray, the other grid structure remaining in the tray, if desired.

After the single grid structure has been removed from the tray T and while held by the open handles 4 and 5, said grid structure, by force applied to said handles, may be moved into arcuate or substantially concave-convex configuration, for example, as indicated in Figs. 7 and 7a, the convex surface of said grid structure being the side to which the ice cubes adhere and the concave surface of said grid structure being the side which is free from ice cubes. As a result, the grid sections 7a are caused to assume a diverging relation with respect to each other and break the frozen connections holding the ice cubes to said grid sections whereby said ice cubes are ejected and are thereafter utilizable individually as desired.

Normally, while the grid structures g, g1 are within the tray T as indicated in Fig. 1, the kicker members 7b, 7c for each grid structure are disposed substantially in a plane which is parallel with respect to the plane of the adjacent supporting member 1. When the grid structure is moved to arcuate or concave-convex configuration as stated, each set of vertically disposed kicker members 7b, 7c form an angle with each other and with their supporting member 1 so as to assist in breaking the frozen connections holding the ice cubes to the grid sections. In a sense, the ice cubes are kicked from the compartments of the grid structure and this gives rise to the term "kicker" members. This action of the kicker members is more particularly described in Letters Patent No. 2,110,511, granted March 8, 1938.

At any time after completion of the operation last described, the other grid structure may be removed from the tray T and, in a manner similar to that described, moved into concave-convex configuration for the release therefrom of the adhering ice cubes.

In Figs. 8-11 inclusive, I have illustrated a modified form of the invention which, from the viewpoint of cleanliness, manufacturing procedure, expense, etc. is highly advantageous compared with earlier forms of the invention.

Thus, with the form of the invention of Figs. 8-11 inclusive, each grid structure g10 and g11 comprises a strap-like supporting member 21 formed from suitable sheet material, this member 21 carrying, at opposite ends thereof, the respective plate sections 2 and 3 of the same general character as those hereinbefore described, said plate sections 2, 3 being suitably secured to said member 21, as by the spot-welded areas 22, and said plate sections 2, 3 carrying the respective handles 4, 5 corresponding with the handles described in connection with Figs. 1-7 inclusive.

In accordance with the invention, each grid structure g11 and g12 has secured thereto a plurality of spaced grid sections 23 formed from suitable sheet material, these grid sections 23 being disposed approximately at right angles with respect to their respective supporting members 21. These grid sections 23 may be secured to the respective supporting members 21 in any suitable manner but, preferably, as herein illustrated, each grid section comprises upper and lower base sections 23a, 23b which, by spot-welded areas 24, are secured to the adjacent supporting member 21.

Between each pair of grid sections 23, each supporting member 21 comprises upper and lower kicker sections or members 21a, 21b facing, respectively, in opposite directions. Preferably, these kicker sections 21a, 21b are formed in the following manner: Before any group of plate sections 2, 3 and grid sections 23 are attached to a supporting member 21, the latter, while a plane sheet of material, is subjected to a stamping operation in a suitable machine whereby the sheet material forming said member 21 is suitably cut in the proper zones so as to form the kicker sections 21a, 21b. At this time, the supporting member 21 should be subjected to a suitable tooling operation so as to form a suitable groove 21c extending throughout the length of and preferably beyond the attached end of each kicker section 21a, 21b. These grooves 21c are highly desirable for strengthening purposes. In addition, if necessary, each supporting member 21 may be provided with one or more longitudinally extending grooves 21d utilizable for strengthening purposes.

It will be understood that the grid structures g11, g12 may be disposed in a tray T in the same manner as indicated in Fig. 1, that the tray may be filled with water and subjected to a freezing operation, and that the sets of handles 4, 5 may then be operated to break the frozen connections holding the ice cubes to the tray. Thereafter, each grid structure g11 and g12, individually and separately, may be removed from the tray and bent into concave-convex configuration so as to eject the ice cubes therefrom.

In the form of my invention shown in Figs. 8-11 inclusive, the kicker sections or members are not formed integrally with the laterally extending grid sections as is true with respect to earlier forms of my invention. Rather, in said Figs. 8-11 inclusive, the kicker members 21a, 21b are portions associated with the supporting member 21 and are integrally united therewith by the disclosed uncut sections. It results, therefore, that, when a supporting member 21 of Figs. 8-11 inclusive is substantially straight, the kicker members 21a, 21b extend longitudinally thereof or, in other words, are in the plane thereof or substantially so, Fig. 9. However, when said supporting member 21 is moved to concave-convex configuration, these kicker portions 21a, 21b assume an angular relation with respect to the supporting member 21, Figs. 10 and 11, and thereby assist in ejecting the ice cubes. Obviously, the grooves 21c serve to prevent undue bending of the kicker sections 21a, 21b whereby they serve the intended purpose in an efficient manner.

In Fig. 12, I have shown one of the laterally extending grid sections 23 as comprising an upper angular related section 23c which, in an obvious manner, serves to prevent undue bending of the grid section when subjected to the stress and strain of the freezing and cube-ejecting operations. It shall be understood that the feature illustrated in Fig. 12 is applicable to all forms of my invention.

In preferred forms of the invention, the supporting members 1, 21 and the grid sections 7a, 23 have been constructed from stainless sheet steel. It shall be understood, however, that the invention is not to be thus limited because other sheet material such as may be formed from plain steel, hard brass, phosphor bronze, or equivalent may be used as desired. The thickness of the sheet material may be such as is desirable. Preferably, from the viewpoint of expense, the thickness is kept at a minimum. However, the thickness of the material, even when grooved, should be sufficient to prevent undesirable deformation. Moreover, as regards the supporting members 1 and 21, the thickness thereof should be such as permits ready flexing for the purpose described.

The hereinbefore described flanged surfaces 11a are useful because assisting in the detachment of those cubes from the tray surfaces which occupy the end compartments of the grid arrangement.

The hereinbefore described end sections 2b of the plate section 2 serve as stop surfaces to be engaged by sections of the handle 4 to thereby prevent undue swinging movement of the latter. Similarly, the upper edge of the plate section 3 to the left and the lateral section 3b of said plate section 3 prevents undue swinging movement of the handle 5. It will be understood that said end section 2b toward the right, Fig. 7, and said lateral section 3b serves to hold the sets of handles 4 and 5, when swung inwardly, a slight distance above the water level so that they will not be frozen into the ice.

While the invention has been described with respect to certain particular preferred examples which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. A grid structure adapted to be inserted into a tray for the production of ice cubes, said grid structure comprising a flexible supporting member formed from thin sheet material, spaced grid sections projecting from one side of said supporting member, ice cube kicker means disposed between pairs of adjacent grid sections, said kicker means comprising a movable kicker member formed from a partially cut-out section of said supporting member.

2. A grid structure adapted to be inserted into a tray for the production of ice cubes, said grid structure comprising a flexible supporting member formed from thin sheet material, spaced grid sections projecting from one side of said supporting member, ice cube kicker means disposed between pairs of adjacent grid sections, said kicker means comprising a movable kicker member formed from a partially cut-out section of said supporting member, said kicker member being disposed approximately in the plane of said supporting member while the latter is in straight-line relation and said kicker member being angularly related to said supporting member when the latter is in flexed condition.

3. A grid structure adapted to be inserted into a tray for the production of ice cubes, said grid structure comprising a flexible supporting member formed from thin sheet material, spaced grid sections projecting from one side of said supporting member, ice cube kicker means disposed between pairs of adjacent grid sections, said kicker means comprising movable members disposed in the plane of said supporting member while the latter is in straight-line relation, and a strengthening groove extending longitudinally of each of said movable members.

4. A grid structure adapted to be inserted into a tray for the production of ice cubes, said grid structure comprising a single flexible supporting member formed from thin sheet material, spaced grid sections projecting from one side of said supporting member, ice cube kicker means disposed between pairs of adjacent grid sections, said kicker means comprising a movable kicker member formed integrally with said supporting member, said grid structure being constructed and arranged to have force applied to the respective opposite ends thereof after it has been removed from the tray with the ice cubes adhering thereto so as to bend it into concave-convex configuration and thereby eject the ice cubes therefrom, the convex side of said grid structure being the side from which said grid sections project and the concave side of said grid structure being the side which is free from said grid sections.

5. A grid arrangement adapted to be inserted into a tray for the production of ice cubes, said grid arrangement comprising separate grid structures adapted to be disposed longitudinally of said tray, each of said grid structures comprising a flexible member extending substantially from one end of said grid arrangement to the other end thereof and a set of grid sections extending laterally from and fixed to said flexible member so as to form compartments within said tray, each of said grid structures comprising ice cube ejecting means disposed between pairs of adjacent grid sections, said grid structures, after release of the frozen connections of the ice cubes to the tray, being removable individually, or jointly from the tray with the ice cubes adhering only to one side of each grid structure, each grid structure thereafter being movable into substantially concave-convex configuration, the convex surface of said grid structure being the side to which the ice cubes adhere and the concave surface of said grid structure being the side thereof which is free from ice cubes, movement of each grid structure into substantially concave-convex configuration as specified causing the grid sections to assume a diverging relation with respect to each other and break the frozen connections holding the ice cubes to said grid sections.

6. A grid structure adapted to be inserted into a tray for the production of ice cubes, said grid structure comprising a flexible supporting member formed from thin sheet material, spaced grid sections projecting from one side of said supporting member, ice cube kicker means disposed between pairs of adjacent grid sections, said kicker means comprising a movable kicker member formed from a partially cut-out section of said supporting member, and handles pivoted to the respective opposite ends of said grid structure, one of said handles comprising a cam section.

HARRY B. RUDD.